(12) United States Patent
Griffin et al.

(10) Patent No.: US 7,653,930 B2
(45) Date of Patent: *Jan. 26, 2010

(54) METHOD FOR ROLE AND RESOURCE POLICY MANAGEMENT OPTIMIZATION

(75) Inventors: Philip B. Griffin, Longmont, CO (US); Manish Devgan, Broomfield, CO (US); Alex Toussaint, Broomfield, CO (US); Rod McCauley, Loveland, CO (US)

(73) Assignee: BEA Systems, Inc., San Jose, CA (US)

( * ) Notice: Subject to any disclaimer, the term of this patent is extended or adjusted under 35 U.S.C. 154(b) by 380 days.

This patent is subject to a terminal disclaimer.

(21) Appl. No.: 10/366,778

(22) Filed: Feb. 14, 2003

(65) Prior Publication Data

US 2004/0162905 A1 Aug. 19, 2004

(51) Int. Cl.
*G06F 17/00* (2006.01)
(52) U.S. Cl. .......................................................... 726/1
(58) Field of Classification Search ...................... 726/1
See application file for complete search history.

(56) References Cited

U.S. PATENT DOCUMENTS

| | | | |
|---|---|---|---|
| 5,173,939 A * | 12/1992 | Abadi et al. ................... | 707/9 |
| 5,237,614 A | 8/1993 | Weiss | |
| 5,335,345 A | 8/1994 | Frieder et al. | |
| 5,341,478 A | 8/1994 | Travis, Jr. et al. | |
| 5,347,653 A | 9/1994 | Flynn et al. | |
| 5,355,474 A | 10/1994 | Thuraisingham et al. | |
| 5,369,702 A | 11/1994 | Shanton ....................... | 713/166 |
| 5,426,747 A | 6/1995 | Weinreb et al. | |
| 5,481,700 A | 1/1996 | Thuraisingham ............ | 395/600 |
| 5,544,322 A | 8/1996 | Cheng et al. | |
| 5,557,747 A | 9/1996 | Rogers et al. | |
| 5,619,710 A | 4/1997 | Travis, Jr. et al. | |
| 5,627,886 A | 5/1997 | Bowman ..................... | 379/111 |
| 5,757,669 A | 5/1998 | Christie et al. | |
| 5,797,128 A * | 8/1998 | Birnbaum ....................... | 707/5 |
| 5,825,883 A | 10/1998 | Archibald et al. | |
| 5,826,000 A | 10/1998 | Hamilton | |

(Continued)

FOREIGN PATENT DOCUMENTS

EP 1 256 889 11/2002

(Continued)

OTHER PUBLICATIONS

Microsoft Computer Dictionary, 5th Edition, 2002, p. 81.*

(Continued)

*Primary Examiner*—Jacob Lipman
(74) *Attorney, Agent, or Firm*—Townsend and Townsend and Crew LLP

(57) ABSTRACT

Methods are disclosed for authorization to adaptively control access to a resource in a resource hierarchy. At least one role for a principal is retrieved from the resource hierarchy or a first cache based on whether the at east one role was previously retrieved from the resource hierarchy. A policy is retrieved from the resource hierarchy or a second cache based on whether the policy was previously retrieved from the resource hierarchy. The policy is evaluated based on the at least one role and a determination on whether to grant the principal access to the resource is made based on the evaluation of the policy.

28 Claims, 5 Drawing Sheets

U.S. PATENT DOCUMENTS

| | | |
|---|---|---|
| 5,826,268 A | 10/1998 | Schaefer et al. ............... 707/9 |
| 5,848,396 A | 12/1998 | Gerace ........................ 705/10 |
| 5,867,667 A | 2/1999 | Butman et al. |
| 5,872,928 A | 2/1999 | Lewis et al. |
| 5,889,953 A | 3/1999 | Thebaut et al. |
| 5,911,143 A | 6/1999 | Deinhart et al. |
| 5,918,210 A | 6/1999 | Rosenthal et al. |
| 5,941,947 A | 8/1999 | Brown et al. |
| 5,950,195 A | 9/1999 | Stockwell et al. |
| 5,954,798 A | 9/1999 | Shelton et al. |
| 5,956,400 A | 9/1999 | Chaum et al. |
| 5,966,707 A | 10/1999 | Van Huben et al. |
| 5,987,469 A | 11/1999 | Lewis et al. |
| 5,987,611 A | 11/1999 | Freund |
| 5,991,877 A | 11/1999 | Luckenbaugh ............... 713/200 |
| 6,005,571 A | 12/1999 | Pachauri ..................... 345/339 |
| 6,006,194 A | 12/1999 | Merel |
| 6,014,666 A | 1/2000 | Helland et al. |
| 6,023,765 A | 2/2000 | Kuhn |
| 6,029,144 A | 2/2000 | Barrett et al. |
| 6,029,182 A | 2/2000 | Nehab et al. ................. 715/523 |
| 6,029,196 A | 2/2000 | Lenz |
| 6,054,910 A | 4/2000 | Tada et al. |
| 6,055,515 A | 4/2000 | Consentino et al. |
| 6,055,637 A | 4/2000 | Hudson et al. |
| 6,058,392 A | 5/2000 | Sampson et al. |
| 6,073,242 A | 6/2000 | Hardy et al. |
| 6,083,276 A | 7/2000 | Davidson et al. ................ 717/1 |
| 6,088,679 A | 7/2000 | Barkley |
| 6,098,173 A | 8/2000 | Elgressy et al. |
| 6,108,687 A | 8/2000 | Craig |
| 6,122,647 A | 9/2000 | Horowitz et al. |
| 6,141,010 A | 10/2000 | Hoyle ........................ 715/854 |
| 6,141,686 A | 10/2000 | Jackowski et al. |
| 6,148,333 A | 11/2000 | Guedalia et al. |
| 6,154,844 A | 11/2000 | Touboul et al. |
| 6,157,924 A | 12/2000 | Austin ........................ 707/10 |
| 6,158,007 A * | 12/2000 | Moreh et al. .................... 726/1 |
| 6,158,010 A | 12/2000 | Moriconi et al. |
| 6,161,139 A | 12/2000 | Win et al. |
| 6,167,407 A | 12/2000 | Nachenberg et al. |
| 6,167,445 A | 12/2000 | Gai et al. |
| 6,170,009 B1 | 1/2001 | Mandal et al. |
| 6,182,226 B1 | 1/2001 | Reid et al. ................... 713/201 |
| 6,182,277 B1 | 1/2001 | DeGroot et al. |
| 6,185,587 B1 | 2/2001 | Bernardo et al. |
| 6,202,066 B1 | 3/2001 | Barkley et al. |
| 6,202,157 B1 | 3/2001 | Brownlie et al. |
| 6,202,207 B1 | 3/2001 | Donohue |
| 6,209,101 B1 | 3/2001 | Mitchem et al. |
| 6,216,231 B1 | 4/2001 | Stubblebine |
| 6,226,745 B1 | 5/2001 | Wiederhold ................. 713/200 |
| 6,241,608 B1 | 6/2001 | Torango ....................... 463/27 |
| 6,243,747 B1 | 6/2001 | Lewis et al. |
| 6,253,321 B1 | 6/2001 | Nikander et al. |
| 6,256,741 B1 | 7/2001 | Stubblebine |
| 6,260,050 B1 | 7/2001 | Yost et al. ................. 715/501.1 |
| 6,269,393 B1 | 7/2001 | Yost et al. ................... 709/201 |
| 6,269,456 B1 | 7/2001 | Hodges et al. |
| 6,275,941 B1 | 8/2001 | Saito et al. |
| 6,285,366 B1 | 9/2001 | Ng et al. |
| 6,285,985 B1 | 9/2001 | Horstmann .................. 705/14 |
| 6,292,900 B1 | 9/2001 | Ngo et al. |
| 6,295,607 B1 | 9/2001 | Johnson |
| 6,301,613 B1 | 10/2001 | Ahlstrom et al. |
| 6,304,881 B1 | 10/2001 | Halim et al. |
| 6,308,163 B1 | 10/2001 | Du et al. ........................ 705/8 |
| 6,317,868 B1 | 11/2001 | Grimm et al. |
| 6,321,336 B1 | 11/2001 | Applegate et al. |
| 6,327,594 B1 | 12/2001 | Van Huben et al. |
| 6,327,618 B1 | 12/2001 | Ahlstrom et al. |
| 6,327,628 B1 | 12/2001 | Anuff et al. |
| 6,339,423 B1 | 1/2002 | Sampson et al. |
| 6,339,826 B2 | 1/2002 | Hayes, Jr. et al. |
| 6,341,352 B1 | 1/2002 | Child et al. |
| 6,353,886 B1 | 3/2002 | Howard et al. |
| 6,360,363 B1 | 3/2002 | Moser et al. |
| 6,377,973 B2 | 4/2002 | Gideon |
| 6,381,579 B1 | 4/2002 | Gervais et al. |
| 6,385,627 B1 | 5/2002 | Cragun |
| 6,393,474 B1 | 5/2002 | Eichert et al. |
| 6,397,222 B1 | 5/2002 | Zellweger |
| 6,397,231 B1 | 5/2002 | Salisbury et al. |
| 6,412,070 B1 | 6/2002 | Van Dyke et al. |
| 6,412,077 B1 | 6/2002 | Roden et al. |
| 6,418,448 B1 | 7/2002 | Sarkar |
| 6,430,556 B1 | 8/2002 | Goldberg et al. |
| 6,434,607 B1 | 8/2002 | Haverstock et al. |
| 6,457,007 B1 | 9/2002 | Kikuchi et al. |
| 6,460,141 B1 | 10/2002 | Olden ........................ 713/201 |
| 6,466,239 B2 | 10/2002 | Ishikawa |
| 6,466,932 B1 | 10/2002 | Dennis et al. |
| 6,473,791 B1 | 10/2002 | Al-Ghosein et al. |
| 6,477,543 B1 | 11/2002 | Huang et al. |
| 6,477,575 B1 | 11/2002 | Koeppel et al. |
| 6,484,177 B1 | 11/2002 | Van Huben et al. |
| 6,484,261 B1 | 11/2002 | Wiegel |
| 6,487,594 B1 | 11/2002 | Bahlmann |
| 6,510,513 B1 | 1/2003 | Danieli |
| 6,519,647 B1 | 2/2003 | Howard et al. |
| 6,530,024 B1 | 3/2003 | Proctor |
| 6,539,375 B2 | 3/2003 | Kawasaki ..................... 707/5 |
| 6,542,993 B1 | 4/2003 | Erfani |
| 6,571,247 B1 | 5/2003 | Danno et al. ................ 707/100 |
| 6,574,736 B1 * | 6/2003 | Andrews ..................... 726/21 |
| 6,581,054 B1 | 6/2003 | Bogrett |
| 6,581,071 B1 | 6/2003 | Gustman et al. |
| 6,584,454 B1 | 6/2003 | Hummel et al. |
| 6,587,849 B1 | 7/2003 | Mason et al. ................... 707/5 |
| 6,587,876 B1 | 7/2003 | Mahon et al. |
| 6,615,218 B2 | 9/2003 | Mandal et al. |
| 6,618,806 B1 | 9/2003 | Brown et al. |
| 6,633,538 B1 | 10/2003 | Tanaka et al. |
| 6,654,747 B1 | 11/2003 | Van Huben et al. |
| 6,665,677 B1 | 12/2003 | Wotring et al. |
| 6,668,354 B1 | 12/2003 | Chen et al. ................... 715/517 |
| 6,671,689 B2 | 12/2003 | Papierniak |
| 6,684,369 B1 | 1/2004 | Bernardo et al. |
| 6,697,805 B1 | 2/2004 | Choquier et al. |
| 6,715,077 B1 | 3/2004 | Vasudevan et al. |
| 6,721,888 B1 | 4/2004 | Liu et al. |
| 6,728,748 B1 | 4/2004 | Mangipudi et al. |
| 6,732,144 B1 | 5/2004 | Kizu et al. |
| 6,735,586 B2 | 5/2004 | Timmons ....................... 707/3 |
| 6,735,701 B1 | 5/2004 | Jacobson |
| 6,738,789 B2 | 5/2004 | Multer et al. |
| 6,751,659 B1 | 6/2004 | Fenger et al. |
| 6,754,672 B1 | 6/2004 | McLauchlin ............. 707/104.1 |
| 6,757,698 B2 | 6/2004 | McBride et al. |
| 6,757,822 B1 | 6/2004 | Feiertag et al. |
| 6,769,095 B1 | 7/2004 | Brassard et al. |
| 6,769,118 B2 | 7/2004 | Garrison et al. |
| 6,772,332 B1 | 8/2004 | Boebert et al. |
| 6,779,002 B1 | 8/2004 | Mwaura |
| 6,789,202 B1 | 9/2004 | Ko et al. |
| 6,792,537 B1 | 9/2004 | Liu et al. |
| 6,832,313 B1 | 12/2004 | Parker |
| 6,834,284 B2 | 12/2004 | Acker et al. |
| 6,854,035 B2 | 2/2005 | Dunham et al. |
| 6,856,999 B2 | 2/2005 | Flanagin et al. |
| 6,857,012 B2 | 2/2005 | Sim et al. |
| 6,865,549 B1 | 3/2005 | Connor |
| 6,873,988 B2 | 3/2005 | Herrmann et al. |
| 6,880,005 B1 | 4/2005 | Bell et al. |

| Patent/Publication | Date | Name |
|---|---|---|
| 6,889,222 B1 | 5/2005 | Zhao |
| 6,901,403 B1 | 5/2005 | Bata et al. |
| 6,904,454 B2 | 6/2005 | Stickler |
| 6,917,975 B2 * | 7/2005 | Griffin et al. ............... 709/225 |
| 6,920,457 B2 | 7/2005 | Pressmar |
| 6,922,695 B2 | 7/2005 | Skufca et al. |
| 6,931,549 B1 | 8/2005 | Ananda |
| 6,934,934 B1 | 8/2005 | Osborne, II et al. |
| 6,957,261 B2 | 10/2005 | Lortz |
| 6,961,897 B1 | 11/2005 | Peel et al. |
| 6,965,999 B2 | 11/2005 | Fox et al. |
| 6,970,445 B2 | 11/2005 | O'Neill et al. |
| 6,970,876 B2 | 11/2005 | Hotti et al. |
| 6,978,379 B1 | 12/2005 | Goh et al. |
| 6,985,915 B2 | 1/2006 | Somalwar et al. |
| 6,988,138 B1 | 1/2006 | Alcorn et al. |
| 7,003,578 B2 | 2/2006 | Kanada et al. |
| 7,035,879 B2 | 4/2006 | Shi et al. |
| 7,035,944 B2 | 4/2006 | Fletcher et al. |
| 7,039,176 B2 | 5/2006 | Borodow et al. |
| 7,043,685 B2 | 5/2006 | Azuma |
| 7,047,522 B1 | 5/2006 | Dixon, III et al. |
| 7,051,316 B2 | 5/2006 | Charisius et al. |
| 7,054,910 B1 | 5/2006 | Nordin et al. |
| 7,062,490 B2 | 6/2006 | Adya et al. |
| 7,062,511 B1 | 6/2006 | Poulsen |
| 7,080,000 B1 | 7/2006 | Cambridge |
| 7,085,755 B2 | 8/2006 | Bluhm et al. |
| 7,089,584 B1 | 8/2006 | Sharma |
| 7,093,200 B2 | 8/2006 | Schreiber et al. |
| 7,093,261 B1 | 8/2006 | Harper et al. |
| 7,093,283 B1 | 8/2006 | Chen et al. |
| 7,111,321 B1 | 9/2006 | Watts, Jr. et al. |
| 7,124,413 B1 | 10/2006 | Klemm et al. |
| 7,174,563 B1 | 2/2007 | Brownlie et al. |
| 7,185,010 B2 | 2/2007 | Morinville |
| 7,185,192 B1 | 2/2007 | Kahn |
| 7,219,140 B2 | 5/2007 | Marl et al. |
| 7,251,666 B2 | 7/2007 | Morinville |
| 7,269,664 B2 | 9/2007 | Hutsch et al. |
| 7,272,625 B1 | 9/2007 | Hannel et al. |
| 7,591,000 B2 | 9/2009 | Griffin et al. |
| 2001/0032128 A1 | 10/2001 | Kepecs |
| 2001/0034771 A1 | 10/2001 | Hutsch et al. |
| 2001/0039586 A1 | 11/2001 | Primak et al. |
| 2001/0044810 A1 | 11/2001 | Timmons |
| 2001/0047485 A1 | 11/2001 | Brown et al. |
| 2002/0005867 A1 | 1/2002 | Gvily |
| 2002/0010741 A1 | 1/2002 | Stewart et al. |
| 2002/0019827 A1 | 2/2002 | Shiman et al. |
| 2002/0023122 A1 | 2/2002 | Polizzi et al. |
| 2002/0029296 A1 | 3/2002 | Anuff et al. |
| 2002/0046099 A1 | 4/2002 | Frengut et al. |
| 2002/0059394 A1 | 5/2002 | Sanders |
| 2002/0062451 A1 | 5/2002 | Scheidt et al. |
| 2002/0067370 A1 | 6/2002 | Forney et al. |
| 2002/0069261 A1 | 6/2002 | Bellare et al. ............... 709/218 |
| 2002/0087571 A1 | 7/2002 | Stapel et al. |
| 2002/0103818 A1 | 8/2002 | Amberden |
| 2002/0104071 A1 | 8/2002 | Charisius et al. |
| 2002/0107913 A1 | 8/2002 | Rivera et al. ............... 709/203 |
| 2002/0107920 A1 | 8/2002 | Hotti |
| 2002/0111998 A1 | 8/2002 | Kim |
| 2002/0112171 A1 | 8/2002 | Ginter et al. |
| 2002/0120685 A1 | 8/2002 | Srivastava et al. |
| 2002/0123983 A1 | 9/2002 | Riley et al. |
| 2002/0124053 A1 | 9/2002 | Adams et al. |
| 2002/0135617 A1 | 9/2002 | Samid |
| 2002/0143819 A1 | 10/2002 | Han et al. |
| 2002/0147645 A1 | 10/2002 | Alao et al. |
| 2002/0147801 A1 | 10/2002 | Gullotta et al. |
| 2002/0152267 A1 | 10/2002 | Lennon |
| 2002/0152279 A1 | 10/2002 | Sollenberger et al. |
| 2002/0161903 A1 | 10/2002 | Besaw |
| 2002/0169893 A1 | 11/2002 | Chen et al. |
| 2002/0169975 A1 | 11/2002 | Good |
| 2002/0173971 A1 | 11/2002 | Stirpe et al. ............... 705/1 |
| 2002/0178119 A1 | 11/2002 | Griffin et al. |
| 2002/0188869 A1 | 12/2002 | Patrick |
| 2002/0194267 A1 | 12/2002 | Flesner et al. |
| 2003/0004982 A1 | 1/2003 | Brandon et al. |
| 2003/0014442 A1 | 1/2003 | Shiigi et al. |
| 2003/0032409 A1 | 2/2003 | Hutcheson et al. |
| 2003/0033356 A1 | 2/2003 | Tran |
| 2003/0046576 A1 | 3/2003 | High, Jr. et al. |
| 2003/0065721 A1 | 4/2003 | Roskind |
| 2003/0069874 A1 | 4/2003 | Hertzog et al. |
| 2003/0078959 A1 | 4/2003 | Yeung et al. |
| 2003/0078972 A1 | 4/2003 | Tapissier et al. |
| 2003/0088617 A1 | 5/2003 | Clark et al. |
| 2003/0110448 A1 | 6/2003 | Haut et al. |
| 2003/0115484 A1 | 6/2003 | Moriconi et al. |
| 2003/0120686 A1 | 6/2003 | Kim et al. |
| 2003/0126236 A1 | 7/2003 | Marl et al. |
| 2003/0126464 A1 | 7/2003 | McDaniel et al. |
| 2003/0126558 A1 | 7/2003 | Griffin |
| 2003/0131113 A1 | 7/2003 | Reeves et al. ............... 709/229 |
| 2003/0135490 A1 | 7/2003 | Barrett et al. |
| 2003/0140308 A1 | 7/2003 | Murthy et al. |
| 2003/0145275 A1 | 7/2003 | Qian et al. |
| 2003/0146937 A1 | 8/2003 | Lee |
| 2003/0167315 A1 | 9/2003 | Chowdhry et al. |
| 2003/0167455 A1 | 9/2003 | Iborra et al. |
| 2003/0182577 A1 | 9/2003 | Mocek |
| 2003/0187956 A1 | 10/2003 | Belt et al. |
| 2003/0200350 A1 | 10/2003 | Kumar et al. |
| 2003/0204481 A1 | 10/2003 | Lau |
| 2003/0212766 A1 | 11/2003 | Giles et al. |
| 2003/0216938 A1 | 11/2003 | Shour |
| 2003/0220913 A1 | 11/2003 | Doganata et al. |
| 2003/0220963 A1 | 11/2003 | Golovinsky et al. |
| 2003/0229501 A1 | 12/2003 | Copeland et al. |
| 2003/0229623 A1 | 12/2003 | Chang et al. ............... 707/3 |
| 2004/0003071 A1 | 1/2004 | Mathew et al. |
| 2004/0010719 A1 | 1/2004 | Daenen |
| 2004/0019494 A1 | 1/2004 | Ridgeway et al. |
| 2004/0019650 A1 | 1/2004 | Auvenshine |
| 2004/0024812 A1 | 2/2004 | Park et al. |
| 2004/0030744 A1 | 2/2004 | Rubin et al. |
| 2004/0030746 A1 | 2/2004 | Kavacheri et al. |
| 2004/0030795 A1 | 2/2004 | Hesmer et al. |
| 2004/0078371 A1 | 4/2004 | Worrall et al. |
| 2004/0098467 A1 | 5/2004 | Dewey et al. |
| 2004/0098606 A1 | 5/2004 | Tan et al. |
| 2004/0107360 A1 | 6/2004 | Herrmann et al. |
| 2004/0162733 A1 | 8/2004 | Griffin et al. |
| 2004/0162905 A1 | 8/2004 | Griffin et al. |
| 2004/0162906 A1 | 8/2004 | Griffin et al. |
| 2004/0167880 A1 | 8/2004 | Smith |
| 2004/0167899 A1 | 8/2004 | Patadia et al. |
| 2004/0205473 A1 | 10/2004 | Fisher et al. |
| 2004/0205557 A1 | 10/2004 | Bahrs et al. |
| 2004/0215650 A1 | 10/2004 | Shaji et al. |
| 2004/0230546 A1 | 11/2004 | Rogers |
| 2004/0236760 A1 | 11/2004 | Arkeketa et al. |
| 2004/0243824 A1 | 12/2004 | Jones |
| 2005/0021502 A1 | 1/2005 | Chen et al. |
| 2005/0021656 A1 | 1/2005 | Callegari |
| 2005/0050184 A1 | 3/2005 | Boden et al. |
| 2005/0060324 A1 | 3/2005 | Johnson et al. |
| 2005/0086206 A1 | 4/2005 | Balasubramanian et al. |
| 2005/0097008 A1 | 5/2005 | Ehring et al. |
| 2005/0138411 A1 | 6/2005 | Griffin et al. |
| 2005/0138412 A1 | 6/2005 | Griffin et al. |
| 2005/0188295 A1 | 8/2005 | Konkus et al. |
| 2005/0198617 A1 | 9/2005 | Kim et al. |

| | | | |
|---|---|---|---|
| 2005/0256894 | A1 | 11/2005 | Talanis et al. |
| 2005/0257267 | A1 | 11/2005 | Wiilliams et al. |
| 2006/0005150 | A1 | 1/2006 | Pankovcin |
| 2006/0059107 | A1 | 3/2006 | Elmore et al. |
| 2006/0085412 | A1 | 4/2006 | Johnson et al. |
| 2006/0085836 | A1 | 4/2006 | Lyons, Jr. et al. |
| 2006/0122882 | A1 | 6/2006 | Brown et al. |
| 2006/0167858 | A1 | 7/2006 | Dennis et al. |
| 2006/0225123 | A1 | 10/2006 | Childress et al. |
| 2006/0277594 | A1 | 12/2006 | Chiavegatto, Jr. et al. |
| 2007/0083484 | A1 | 4/2007 | McVeigh et al. |
| 2007/0294743 | A1 | 12/2007 | Kaler et al. |

FOREIGN PATENT DOCUMENTS

| | | |
|---|---|---|
| WO | WO0038078 A1 | 6/2000 |
| WO | WO0114962 A1 | 3/2001 |
| WO | WO 01/67285 | 9/2001 |
| WO | WO 2004/074993 A2 | 9/2004 |
| WO | WO 2004/074994 A2 | 9/2004 |
| WO | WO 2004/074998 A2 | 9/2004 |

OTHER PUBLICATIONS

U.S. Appl. No. 10/367,462, filed Feb. 14, 2003, Philip B. Griffin.
U.S. Appl. No. 10/367,190, filed Feb. 14, 2003, Philip B. Griffin.
U.S. Appl. No. 10/367,177, filed Feb. 14, 2003, Philip B. Griffin.
BEA WebLogic Server, *Assembling and Configuring Web Applications, BEA Systems, Release 7.0*, Revised: Aug. 20, 2002, 165 pages.
BEA WebLogic Server, *Introduction to WebLogic, BEA Systems, Release 7.0*, Document Date: Jun. 2002, Revised:Jun. 28, 2002, 22 pages.
An Introduction to BEA WebLogic Sever Security, *The New Security Architecture of BEA WebLogic Server 7.0, BEA Systems*, May 1, 2002. 20 pages.
BEA WebLogic Server, *Developing Security Providers for WebLogic Server, BEA Systems, Release 7.0*, Revised Aug. 30, 2002, 315 pages.
Sundsted, Todd, "JNDI Overview, Part 1: An Introduction to Naming Services", JavaWorld, Jan. 2000. pp. 1-6, (downloaded from: www.javaworld.com/javaworld/jw-01-2000/jw-01-howto_p.html.).
Moore, Bill, et al., " Migrating Weblogic Applications to WebSphere Advanced Edition", IBM Redbooks, Jan. 2001, pp. 1, 3-4, 109-111 and 181-195.
Barrett, Alexandra, "Trying Out Transactions", SunExpert Magazine, Jan. 1999, pp. 57-59.
Ayers, Danny, et al., Professional Java Server Programming, Wrox Press, Ltd., Birmingham, UK, Dec. 1999, pp. 515-545.
Ford, Nigel, Web Developer.com Guide to Building Intelligent Web Sites with JavaScript, Wiley Computer Publishing, NY, NY © 1998, pp. 65-86, 96-98, 101-102, 245-250 and 324-327.
Microsoft Computer Dictionary, 4th Edition, Microsoft Press, Redmond, WA, © 1999, p. 489.
Eiji Okamoto, "Proposal for Integrated Security Systems", Jun. 1992, IEEE Computer Society Press, p. 354-358.
http://java.sun.com/products/ejb/ (last visit: Dec. 7, 2004).
http://www.javaworld.com/jw-12-2002/jw-1207-yesnoejb_p.html (last visit: Dec. 7, 2004).
"USDataCenter Chooses Baltimore SelectAccess to Enable Next generation Security Solutions for eBusiness"; Business Wire, P2079, Apr. 4, 2001; Newswire; Trade; pp. 2.
Browne, Shirley, et al., "Location-Independent Naming for Virtual Distributed Software Repositories", http://portal.acm.org/dl.cfm, vol. 20, Issue SI, pp. 179-185 (Aug. 1995).
Candan, K.S., et al., "Enabling Dynamic Content Caching for Database-Driven Web Sites", Proceedings of the 2001 ACM SIGMOD International Conference on Management of Data, Santa Barbara, California, USA, May 21-24, 2001, pp. 532-543 (2001).
Catley, Christina, et al., "Design of a Health Care Architecture for Medical Data Interoperability and Application Integration", Proceedings of the Second Joint EMBS/BMES Conference, Houston, TX, USA, Oct. 23-26, 2002, IEEE, vol. 3, pp. 1952-1953 (2002).
Howes, T., "The String Representation of LDAP Search Filters", ftp://ftp.rfc-editor.org/in-notees/rfc2254.txt, The Internet Society, RFC 2254, 8 pages (Dec. 1997).
Adomavicius, Gediminas, et al., "User Profiling in Personalization Applications Through Rule Discovery and Validation", KDD '99, ACM San Diego, CA, pp. 377-381 (1999).
Cingil, Ibrahim, et al., "A Broader Approach to Personalization", Communications of the ACM, vol. 43, No. 6, pp. 136-141 (Aug. 2000).
Stephanidis, Constantine, et al., "Decision Making in Intelligent User Interfaces", IUI '97, ACM Orlando, FL, pp. 195-202 (1997).
Stiemerling, Oliver, et al., "How to Make Software Softer—Desigining Tailorable Applications", DIS '97, ACM, Amsterdam, The Netherlands, pp. 365-376 (1997).
Zhang, Zheng, et al., "Designing a Robust Namespace for Distributed File Services", Reliable Distributed Systems, Proceedings 20th IEEE Symposium on Oct. 28-31, 2001, pp. 162-171 (2001).
Adya, Atul, et al., "FARSITE: Federated, Available and Reliable Storage for an Incompletely Trusted Environment", ACM SIGOPS Operating Systems Review, vol. 36, Issue SI, OSDI '02: Proceedings of the 5th Symposium on Operating Systems Design and Implementation, pp. 1-14 (Winter 2002).
Freudenthal, Eric, et al. "dRBAC: Distributed Role-Based Access Control for Dynamic Coalition Environments", Proceedings of the 22nd International Conference on Distributed Computing Systems (ICDCS '02) IEEE 2002, 10 pages.
Supplementary European Search Report for 02773915.0 dated Oct. 12, 2006, 3 pages.
Supplementary European Search Report for 01975484.5 dated Dec. 19, 2006, 2 pages.
Kistler, T., et al., "WebL—a programming language for the Web", Computer Networks and ISDN Systems, North Holland Publishing, Amsterdam, NL, vol. 30, No. 1-7, pp. 259-270 (Apr. 1998).
Levy, M.R., "Web Programming in Guide", Software Practice & Experience, Wiley & Sons, Bognor Regis, GB, vol. 28, No. 15, pp. 1581-1603 (Dec. 25, 1998).
Atkins, D.L., et al., "Mawl: A Domain-Specific Language for Form-Based Services", IEEE Transactions on Software Engineering, IEEE Service Center, Los Alamitos, CA, US, vol. 25, No. 3, pp. 334-346 (May 1999).
Parker, The Complete Idiot's Guide to Microsoft FrontPage 2000, May 1999, 1-2, 7, 52, Que, USA.
Tanyi, Emmanuel, Easy XML, Mar. 6, 2000, www.winsite.com, pp. 1-6.
Method and System for Visually Constructing Document Type Definitions and Related Artifacts Using a Reusable Object Model, IBM Technical Disclosure Bulletin, copyright IP.com, Inc., May 23, 2001, 3 pages.
http://portal.acm.org/citation.cfm?id=1011436, p. 1, last visited: Oct. 24, 2007.
Koved et al., "Security Challenges for Enterprise Java in an e-Business Environment," pp. 130-152, IBM Systems Journal, vol. 40, No. 1, Jan. 2001.
Microsoft Windows ("Windows Explorer"), copyright 1981-2001, 3 pages.
Rossi, Gustavo et al., "Designing Personalized Web Applications," ACM, WWW10, Hong Kong, May 1-5, 2001, pp. 275-284.
Lee et al., Keeping Virtual Information Resources Up and Running, Nov. 1997, IBM Press, pp. 1-14.
Hayton, R.J. et al., "Access Control in an Open Distributed Environment," 1998 Proceedings of the IEEE Symposium on Security & Privacy, May 3-6, 1998, Oakland, California, USA, 12 pages.
Bertino, Elisa et al., "TRBAC: A Temporal Role-Based Access Control Model," ACM Transactions on Information and System Security (TISSEC), vol. 4, Issue 3 (Aug. 2001), pp. 191-223.
Sandhu, Ravi S. et al., "Role-Based Access Control Models," IEEE Computer, vol. 29, No. 2, Feb. 1996, pp. 38-47.
Covington, Michael J. et al., "Securing Context-Aware Applications Using Environment Roles," ACM Workshop on Role Based Access Control, Proceedings of the Sixth ACM Symposium on Access Control Models and Technologies, SACMAT '01, May 3-4, 2001, Chantilly, Virginia, USA, pp. 10-20.
Yao, Walt et al., "A Model of OASIS Role-Based Access Control and Its Support for Active Security," ACM Workshop on Role Based Access Control, Proceedings of the Sixth ACM Symposium on Access Control Models and Technologies, SACMAT '01, May 3-4, 2001, Chantilly, Virginia, USA, pp. 171-181.

Georgiadis, Christos K. et al., "Flexible Team-Based Access Control Using Contexts," ACM Workshop on Role Based Access Control, Proceedings of the Sixth ACM Symposium on Access Control Models and Technologies, SACMAT '01, May 3-4, 2001, Chantilly, Virginia, USA, pp. 21-27.

Tzelepi, Sofia K. et al., "A Flexible Content and Context-Based Access Control Model for Multimedia Medical Image Database Systems," International Multimedia Conference, Proceedings of the 2001 ACM Workshop on Multimedia and Security: New Challenges, Oct. 5, 2001, pp. 52-55.

Goh, Chen et al., "Towards a More Complete Model of Role," Symposium on Access Control Models and Technologies, Proceedings of the Third ACM Workshop on Role-Based Access Control, 1998, Fairfax, Virginia, USA, pp. 55-61.

Baltimore SelectAccess™ next generation authorization management, www.baltimore.com.

Costello, S., "Baltimore to release SelectAccess 5.0 with SAML," Apr. 24, 2002, www.infoworld.com/articles/hn/xml/02/04/24/02042hnsaml.html, printed Feb. 17, 2006.

Supplementary European Search Report dated Jun. 7, 2006 for Application No. EP 02723874, 3 pgs.

"First Data chooses Baltimore SelectAccess to Secure Extranet Applications," Press Release, First Data® International, Mar. 5, 2002, www.firstdata.com.au/news_050302,html, printed Feb. 17, 2006.

Parker, E., "The Complete Idiot's Guide to Microsoft FrontPage 2000," Que, pp. 7 and 55 (1999).

International Search Report mailed Sep. 24, 2004 in International Application No. PCT/US04/04691.

International Search Report mailed Aug. 24, 2004 in International Application No. PCT/US04/04079.

International Search Report and Written Opinion mailed Dec. 15, 2005 in International Application No. PCT/US04/04078.

International Search Report and Written Opinion mailed Dec. 27, 2005 in International Application No. PCT/US04/044140.

International Preliminary Report on Patentability mailed Dec. 1, 2004 in International Application No. PCT/US02/11969.

Symborski, C. W., "Updating Software and Configuring Data in a Distributed Communications Network," Computer Network Symposium, 1988, Proceedings of the Washington, DC, USA Apr. 11-13, 1988 IEEE Comput. Soc. Pr., pp. 331-338.

Final Office Action mailed Jul. 17, 2008 in U.S. Appl. No. 10/367,177.

Non Final Office Action mailed Mar. 24, 2008 in U.S. Appl. No. 10/367,177.

Final Office Action mailed Dec. 20, 2007 in U.S. Appl. No. 10/367,177.

Non Final Office Action mailed Jul. 18, 2007 in U.S. Appl. No. 10/367,177.

Final Office Action mailed Mar. 5, 2007 in U.S. Appl. No. 10/367,177.

Non Final Office Action mailed Jul. 27, 2006 in U.S. Appl. No. 10/367,177.

Non Final Office Action mailed Oct. 30, 2008 in U.S. Appl. No. 10/367,190.

Advisory Action mailed Jul. 24, 2008 in U.S. Appl. No. 10/367,190.

Final Office Action mailed May 12, 2008 in U.S. Appl. No. 10/367,190.

Non Final Office Action mailed Oct. 17, 2007 in U.S. Appl. No. 10/367,190.

Final Office Action mailed May 2, 2007 in U.S. Appl. No. 10/367,190.

Non Final Office Action mailed Aug. 14, 2006 in U.S. Appl. No. 10/367,190.

Final Office Action mailed Dec. 19, 2005 in U.S. Appl. No. 10/367,190.

Non Final Office Action mailed Feb. 25, 2005 in U.S. Appl. No. 10/367,190.

Notice of Allowance mailed Feb. 18, 2005 in U.S. Appl. No. 10/367,462.

Notice of Allowance mailed Feb. 10, 2005 in U.S. Appl. No. 10/367,462.

Final Office Action mailed Nov. 9, 2005 in U.S. Appl. No. 10/367,462.

Non Final Office Action mailed Jun. 21, 2004 in U.S. Appl. No. 10/367,462.

Non Final Office Action mailed Oct. 7, 2008 in U.S. Appl. No. 11/052,148.

Advisory Action mailed Aug. 5, 2008 in U.S. Appl. No. 11/052,148.

Final Office Action mailed Apr. 29, 2008 in U.S. Appl. No. 11/052,148.

Non Final Office Action mailed Feb. 4, 2008 in U.S. Appl. No. 11/052,148.

Non Final Office Action mailed Oct. 7, 2008 in U.S. Appl. No. 11/052,356.

Advisory Action mailed Aug. 5, 2008 in U.S. Appl. No. 11/052,356.

Final Office Action mailed Apr. 29, 2008 in U.S. Appl. No. 11/052,356.

Non Final Office Action mailed Dec. 28, 2007 in U.S. Appl. No. 11/052,356.

Notice of Allowance for U.S. Appl. No. 10/367,177, Mailed Feb. 12, 2009, 7 pages.

Notice of Allowance for U.S. Appl. No. 10/367,177, Mailed May 5, 2009, 11 pages.

Advisory Action for U.S. Appl. No. 11/052,148 mailed on Oct. 26, 2009; 3 pages.

Advisory Action for U.S. Appl. No. 11/052,356 mailed on Oct. 26, 2009; 3 pages.

U.S. Appl. No. 12/536,183, filed Aug. 5, 2009, Griffin et al.

Final Office Action for U.S. Appl. No. 10/367,462 mailed on Jan. 19, 2005; 7 pages.

Final Office Action for U.S. Appl. No. 10/367,190 mailed on May 28, 2009; 22 pages.

Advisory Action for U.S. Appl. No. 10/367,190 mailed on Aug. 21, 2009; 3 pages.

Final Office Action for U.S. Appl. No. 11/052,148 mailed on Jul. 13, 2009; 19 pages.

Final Office Action for U.S. Appl. No. 11/052,356 mailed on Jul. 24, 2009; 20 pages.

* cited by examiner

METHOD FOR ROLE AND RESOURCE POLICY MANAGEMENT OPTIMIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES

This application is related to the following applications which are hereby incorporated by reference in their entirety: SYSTEM AND METHOD FOR HIERARCHICAL ROLE-BASED ENTITLEMENTS, U.S. application Ser. No. 10/367,177, Inventors: Philip B. Griffin, et al., filed on Feb. 14, 2003; METHOD FOR DELEGATED ADMINISTRATION, U.S. application Ser. No. 10/367,190, Inventors: Philip B. Griffin, et al., filed on Feb. 14, 2003; and METHOD FOR ROLE AND RESOURCE POLICY MANAGEMENT, U.S. application Ser. No. 10/367,462, Inventor: Philip B. Griffin, filed on Feb. 14, 2003, now U.S. Pat. No. 6,917,975, issued Jul. 12, 2005.

FIELD OF THE DISCLOSURE

The present invention disclosure relates to authorization and control of resources in an enterprise application.

BACKGROUND

Enterprise applications can increase the availability of goods and services to customers inside and outside of an organization. One issue that accompanies deployment of an enterprise application is authorization or access control. Both customers and system administrators need to be privileged to perform certain actions (e.g., modifying a customer account) or to gain access to certain content. Typical authorization systems can be complex and time consuming to implement and maintain, especially if they are tied closely to the business logic in an enterprise application.

DETAILED DESCRIPTION

Figure 1:
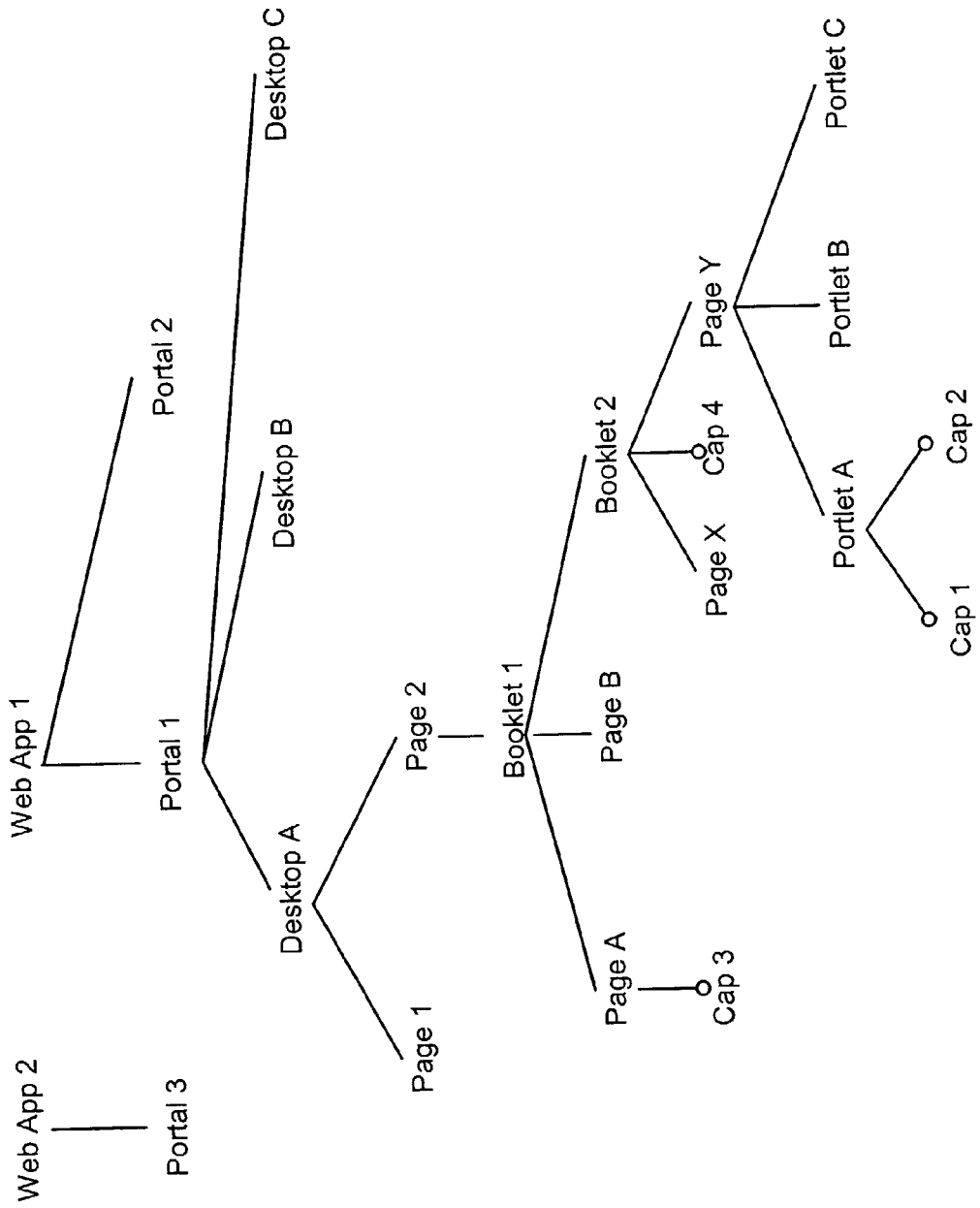
FIG. 1 is an illustration of a exemplary resource hierarchy in accordance to one embodiment of the invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In one embodiment, an enterprise application includes one or more resources that facilitate the performance of business, scientific or other functions and tasks. In another embodiment, an enterprise application can be a Java™ 2 Enterprise Edition (J2EE) deployment unit that bundles together Web Applications, Enterprise Java™ Beans and Resource Adaptors into a single deployable unit. The Java™ programming language and its run-time libraries and environment are available from Sun Microsystems, Inc., of Santa Clara, Calif. Enterprise applications can include software, firmware and hardware elements. Software, firmware and hardware can be arbitrarily combined or divided into separate logical components. Furthermore, it will be apparent to those skilled in the art that such components, irregardless of how they are combined or divided, can execute on the same computer or can be arbitrarily distributed among different computers connected by one or more networks.

In one embodiment, a resource can correspond to any person, place or thing, including an object or an entity (e.g., a network, a computer, a computer user, a bank account, an electronic mail message, aspects of a computer operating system such as virtual memory, threads and file storage, etc.), a method or a process (e.g., balancing a checkbook, installing a device driver, allocating virtual memory, deleting a file, etc.), the occurrence or non-occurrence of an event (e.g., an attempt by a user to logon to a computer, a change in state, etc.) and an organization or association of resources (e.g., lists, trees, maps, hierarchies, etc.).

In one embodiment, resources can be classified into a hierarchical taxonomy (which itself can be a resource). By way of a non-limiting example, in an enterprise application, it may be necessary to refer to a particular resource such as a booklet. In order to reference the booklet, one needs to know which web page it is on, which portal the web page belongs to, which web application (or "web app") owns the web page, and which domain the web app belongs to. Each of these components is considered a resource and can be described as a resource path (e.g., a sequence of components separated by slashes):

domain/web_app/portal/desktop/page/booklet

The first resource is domain which lies at the "top" of the resource hierarchy. Working down the hierarchy, the next component is web_app. The web_app is a "child" or "descendent" of domain and domain is a "parent" of web_app. The domain is superior to web_app and web_app is inferior to domain. Likewise, portal is a child of web_app and a parent of desktop. The page is a child of desktop with booklet as its child. The depth of the resource is the number of components in its path. For example, the depth of booklet is six (assuming that we are counting from 1) and the depth of portal is three. In one embodiment, the depth of a resource can be unlimited.

In one embodiment, a resource can have properties or capabilities. By way of a non-limiting example, a booklet resource could have the ability to be customized by an end-user. The capability could be appended to the hierarchy as follows:

domain/web_app/portal/desktop/page/booklet.customize

FIG. 1 is an illustration of an exemplary resource hierarchy in accordance to one embodiment of the invention. By way of a non-limiting example, this hierarchy can represent resources within an enterprise application. Web App 1 and Web App 2 are Web applications. A Web application resource is a part of an enterprise application that is accessible on the World Wide Web. Portal 1 and Portal 2 are portal resources and are children of Web App 1. Portal 3 is a child of Web App 2. In one embodiment, Web App 1 and Web App 2 can be children of one or more enterprise applications (not shown) which can be children of one or more domains (not shown). A portal is a point of access to data and applications that provides a unified and potentially personalized view of information and resources. Typically, a portal is implemented as one or more pages on a website (Page 1, Page 2, Page A, Page B, Page X, and Page Y). Portal pages can integrate many elements, such as applications, live data feeds, static information and multimedia presentations.

Desktop A, Desktop B and Desktop C contain one or more views of a portal that have been customized for a particular user or group of users. Pages within each desktop can contain portlets (Portlet A, Portlet B, and Portlet C) and booklets (Booklet 1 and Booklet 2). A portlet is a self-contained application that renders itself on a portal page. In one embodiment, a booklet is a collection of one or more pages or booklets. Resource Web App 1/Portal 1/Desktop A/Page 2/Booklet 1/Page A has a capability Cap 3. Likewise, Web App 1/Portal 1/Desktop A/Page 2/Booklet 1/Booklet 2 has a capability Cap 4 and Web App 1/Portal 1/Desktop A/Page 2/Booklet 1/Booklet 2/Page Y/Portlet A has capabilities Cap 1 and Cap 2.

Enterprise applications can control access to their resources and/or capabilities through the use of entitlements. In one embodiment, evaluation of an entitlement consists of determining a security policy by dynamically associating one or more roles with a principal. In one embodiment, a role can be based on rules that take into account information including knowledge about the principal, knowledge about a communication session, the current state of the system, and/or any other relevant information.

In one embodiment, a user represents a person who uses an enterprise application. A group can be an arbitrary collection of users. In one embodiment, members of a group share common traits such as job title, etc. A process can be a software or firmware computer program or portion thereof of any granularity (e.g., a task, thread, lightweight process, distributed object, Enterprise Java™ Bean, or any other computing operation). Users, groups and processes can be considered subjects. Subjects can be authenticated based on providing adequate proof (e.g., password, social security number, etc.) to an authentication system. Once authenticated, a subject can be considered a principal for purposes of evaluating entitlements. A principal is an identity assigned to a user, group or process as a result of authentication. A principal can also represent an anonymous user, group or process (e.g., a subject that has not been authenticated).

In one embodiment, a role definition contains one or more expressions that evaluate to true or false when evaluated for a given principal in a given context. In another embodiment, an expression can evaluate to a degree of certainty that access to a resource should be granted. Expressions may be nested within each other and can contain functions, arithmetic or logical operators, etc. In one embodiment, expressions are combined (e.g., with Boolean operators such as "and", "or", and "not") to form a Boolean expression that evaluates to true or false. If a role evaluates to true, then the principal in question is considered to satisfy the role.

Role expressions can be dynamically evaluated against a principal attempting to access a resource in a given context. A context can contain any information relevant to making a determination of whether a principal belongs in a role. By way of a non-limiting example, a context can include any of a principal's attributes (e.g., name, age, address, etc.) and/or information about a communication session. In another embodiment, a context can include information from a hypertext transfer protocol ("HTTP") or hypertext transfer protocol (secure) (HTTPS) request. This information can pertain to character encoding, remote user, authorization scheme, content length, server port, context path, request URI, request method, scheme, servlet path, content type, remote host, request protocol, locale, server name, remote address, query string, path information, etc. It will be apparent to those skilled in the art that a context can include any information which is relevant to evaluating an expression.

In one embodiment, expressions can include predicates. The invention disclosed herein is not limited to the present predicates discussed. A user predicate evaluates to true if the principal in question is the principal supplied as an argument to the predicate. The group predicate evaluates to true if the principal in question is a member of the specified group.

TABLE 1

Exemplary Roles

| ROLE | EXPRESSION |
| --- | --- |
| Anonymous | Satisfied by all principals |
| BankManager | (User = Donna) |
| CustomerService | (User = Michael or Peter) or (Group = BankTellers) |
| LoanOfficer | (Group = Associate) and (Group = TrainingLevel2) and not (User = Bob) |
| BankManager | (User = Donna) and ((OCT. 14, 2002 <= currentDate <= OCT. 25, 2002) or (NOV. 14, 2002 <= currentDate <= NOV. 25, 2002)) |
| Software | (Segment = JavaDeveloper) |
| SysAdmin | ((User = Donna) and ((OCT. 14, 2002 <= currentDate <= OCT. 25, 2002) or (NOV. 14, 2002 <= currentDate <= NOV. 25, 2002))) or (Segment = SystemAdministrator) |

Table 1 illustrates seven exemplary roles and their accompanying expressions. In one embodiment, the role "Anonymous" is a special role that is always satisfied. In another embodiment, the role of "Anonymous" is satisfied by an unauthenticated principal. The role of "BankManager" is met by a principal that is authenticated as user "Donna". The role of "CustomerService" is fulfilled by a principal authenticated as "Michael" or "Peter", or belonging to group "BankTellers". The "LoanOfficer" role is met by a principal that is a member of both the "Associate" group and the "TrainingLevel2" group, but is not "Bob". Roles can also be dynamic. By way of a non-limiting example, a role can be date and/or time dependent. In one embodiment, a time period can be specified using the currentDate predicate. The role of "BankManager" can be fulfilled by "Donna", but only between Oct. 14, 2002-Oct. 25, 2002 or Nov. 14, 2002-Nov. 25, 2002. It will be apparent to those skilled in the art that many such date or time predicates are possible (e.g., a predicate that is based on a date and a time, or one that is based on time only, etc.).

In addition to the predicates discussed above, a segment predicate (hereafter referred to as a "segment") can also be included in a role definition. A segment evaluates to true if the principal in question satisfies the segment's criteria. A segment can be defined in terms of one or more expressions or conditions which can be nested and include logical operators, mathematical operations, method calls, calls to external systems, function calls, etc. In another embodiment, a segment can be specified in plain language. By way of a non-limiting example:

---

When all of these conditions apply, the principal is a JavaDeveloper:
    Developer is equal to True
    Skill level is equal to 'High'
    Preferred language is equal to 'Java'

In this example, the segment being described is "ExperiencedJavaDeveloper". The condition "Developer is equal to True" will evaluate to true when information contained in or referenced through a context indicates that the principal in question is a user in the software development department of an organization. Likewise, the other conditions ("Skill level is equal to 'High'", "Preferred language is equal to 'Java'") could similarly be evaluated using information from or referenced through a context. In another embodiment, a condition can pertain to information about a communication session. It will be apparent to those skilled in the art that a condition can be based on any information, whether the information is connected with a particular principal or not. If the segment as a whole evaluates to true, the principal is said to have satisfied the segment. In Table 1, by way of a non-limiting example, the role of "Software" is met by a principal that satisfies the "JavaDeveloper" segment.

By way of a further non-limiting example:

```
When all of these conditions apply, the principal is a
SystemAdministrator:
    TimeofDay is between 12:00 am and 7:00 am
    SystemLoad is 'Low'
    AdminSkillLevel is at least 5
```

In this example, two conditions ("TimeofDay is between 12:00 am and 7:00 am" and "SystemLoad is 'Low'") are based on information unrelated to a particular principal. The segment evaluates to true for the principal in question if it is the middle of the night, the system is not busy, and the principal has level 5 administration skills. In Table 1, by way of a non-limiting example, the role of "SysAdmin" is met by "Donna", but only between Oct. 14, 2002-Oct. 25, 2002 or Nov. 14, 2002-Nov. 25, 2002, or by a principal that satisfies the "SystemAdministrator" segment.

In one embodiment, a segment can be persisted in Extensible Markup Language (XML). XML is a platform independent language for representing structured documents. Retrieving information stored in an XML document can be time consuming since the text comprising the XML document must be parsed. To save time, in another embodiment once a XML document representing a segment has been parsed, the information extracted therefrom can be cached to avoid the need to parse the file again.

Figure 2:
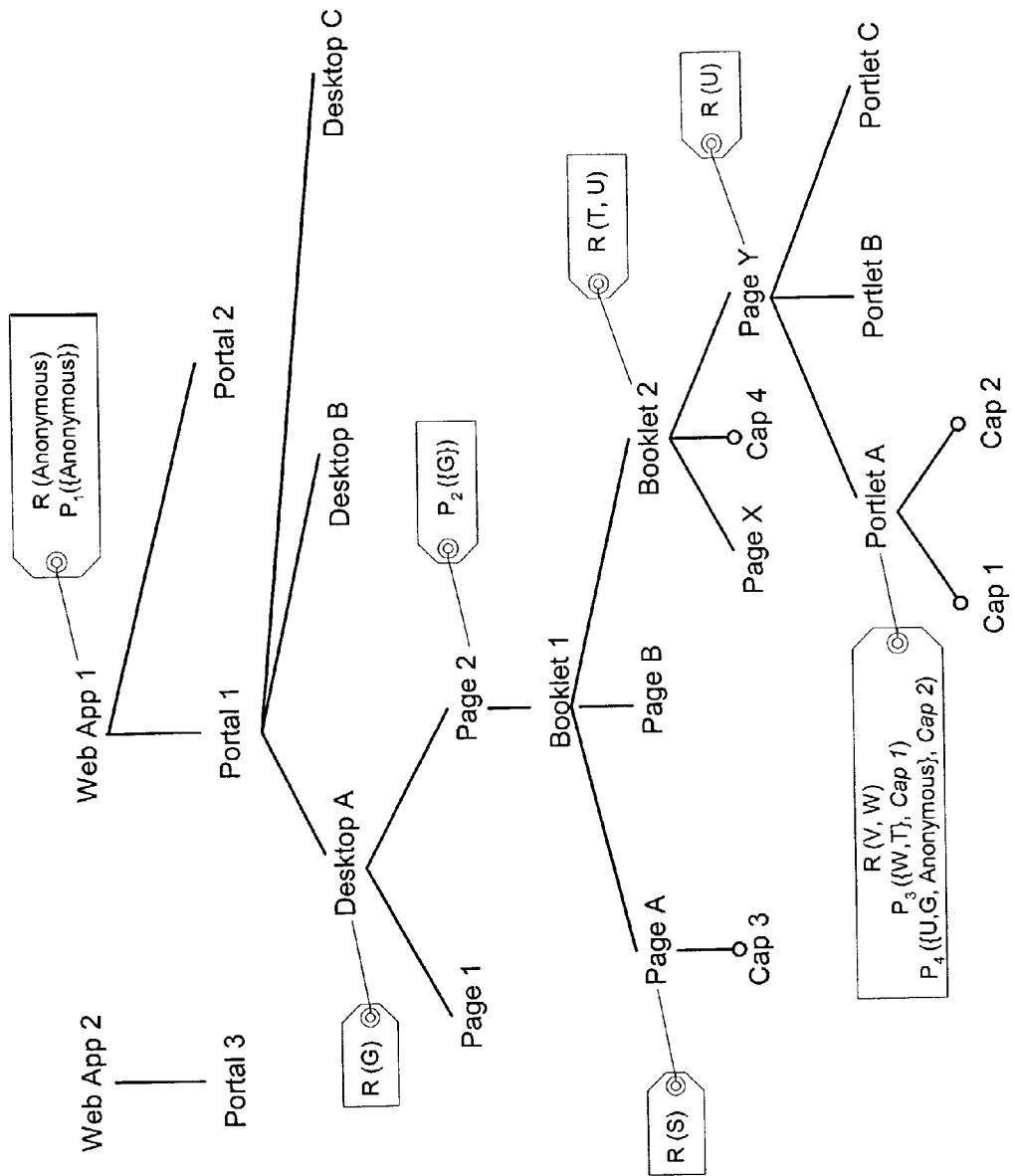
FIG. 2 is the exemplary hierarchy of FIG. 1 further illustrating roles and security policies.

FIG. 2 is the exemplary hierarchy of FIG. 1 further illustrating roles and security policies. Roles are designated by the letter 'R' followed by a parenthetical list of one or more roles. Likewise, policies are designated by the letter 'P' followed by a parenthetical list including a set of roles and an optional capability to which the policy applies. If no capability is present, the policy applies to the resource as a whole. In one embodiment, roles can be considered global in scope or can be associated with a particular resource. A global role is considered within the scope of any resource. In one embodiment, a role associated with a resource is within the scope of that resource. In another embodiment, the role is within the scope of the resource and all of its descendents. In yet another embodiment, the role is within the scope of the resource and all of its descendents unless a role with the same name is associated with a descendent. In this way, a "more local" role occludes a "less local" role of the name.

In FIG. 2, the role Anonymous is associated with the resource Web App 1. In one embodiment, Anonymous is within the scope of Web App 1 and all resources beneath it in the hierarchy. Role G is associated with resource Desktop A and as such, is within the scope of Desktop A and its descendents. Role S is associated with resource Page A. Since Page A has no children (i.e., the attribute Cap 3 does not count as a child), the scope of role S is limited to Page A. Resource Booklet 2 is associated with roles T and U. In one embodiment, role T is within the scope of Booklet 2 and all of its descendents but the same does not hold true for role U. Since a descendent of Booklet 2 (i.e., Page Y) is associated with another role by the same name, the role U associated with Booklet 2 is only within the scope of Booklet 2 and Page X. In one embodiment, the role U associated with Page Y however is within the scope of all of the descendents of Page Y (i.e., Portlet A, Portlet B, and Portlet C). Roles V and W are within the scope of Portlet A.

In one embodiment, a security policy (hereinafter referred to as a "policy") is an association between a resource, a set of roles, and an optional capability. Generally speaking, a policy grants access to the resource for all principals for which the set of roles evaluates to true. In one embodiment, a policy is satisfied if any of its roles evaluate to true for a given principal. In another embodiment, a policy is satisfied if all of its roles evaluate to true for a given principal. In another embodiment, a security policy integrity system can prevent removing or deleting roles that have policies which depend on them. Although one of skill in the art will recognize that there are many ways to implement such a system, one approach would be to keep track of the number of policies that depend on a particular role by using a reference count. Only when the reference count is equal to zero will the particular role be eligible for removal.

In yet a further embodiment, a policy's set of roles can be an expression including Boolean operators, set operators and roles for operands. A policy can be expressed as the tuple <resource, roles, [capability]>, wherein resource specifies the name of a resource and roles specifies a set of roles, and capability is an optional capability. While a policy is predicated on one or more roles, roles are predicated on users and groups. Therefore, one of skill in the art will appreciate that policies are in essence predicated on users, groups, and or segments. By way of illustration, there are four policies illustrated in FIG. 2:

```
P₁ = <Web App 1, {Anonymous}>
P₂ = <Web App 1/Portal 1/Desktop A/Page 2, {G}>
P₃ = <Web App 1/.../Page Y/Portlet A, {W, T}, Cap 1>
P₄ = <Web App 1/.../Page Y/Portlet A, {U, G, Anonymous}, Cap 2>
```

By way of a non-limiting illustration, assume a principal p attempts to access resource Cap 1. In order to do so, the security policy $P_3$ on Cap 1 requires that p satisfy either role W or T. In one embodiment, all roles within the scope of Cap 1 (i.e., Anonymous, G, T, U, U, V, and W) are determined for p. If any of the roles that p satisfies match W or T, $P_3$ is likewise satisfied and access to Cap 1 is granted for p.

By way of a further non-limiting illustration, assume principal p attempts to access capability Cap 2 for resource Portlet A. In order to do so, the security policy $P_4$ on Cap 2 requires that p satisfy one of the roles U, G or Anonymous. In one embodiment, all roles within the scope of Portlet A (i.e., Anonymous, G, T, U, V and W) are determined for p. Note that in one embodiment, the role U associated with resource Booklet 2 is not in the scope of Portal A. Instead, the role having the same name but associated with the more "local" resource Page Y occludes it. Thus, if any of the roles that p satisfies match U, G or Anonymous, $P_4$ is satisfied and access to Cap 2 is granted for p. However, since in one embodiment every principal satisfies the role Anonymous, P₄ will always be satisfied.

By way of a further non-limiting example, assume p attempts to access capability Cap 4 associated with resource Booklet 2. This resource has no policy. In one embodiment, access will be denied. In another embodiment, access will be granted. In yet a further embodiment, access will be granted if p satisfies a policy in a parent resource of Booklet 2. Table 2 is a non-limiting illustration of a parent policy search using the resource hierarchy of FIG. 2. It is important to note, however, that the particular search order or the method of searching is irrelevant for purposes of this disclosure. In yet another embodiment, a resource without an explicit policy can include information regarding its parent policy and thus circumvent the need for a search.

TABLE 2

Exemplary Policy Search

| SEARCH STEP | CURRENT RESOURCE | CAPABILITY | POLICY FOUND? |
|---|---|---|---|
| 1 | Web App 1/Portal 1/Desktop A/Page 2/Booklet 1/Booklet 2 | Cap 4 | No |
| 2 | Web App 1/Portal 1/Desktop A/Page 2/Booklet 1/Booklet 2 | | No |
| 3 | Web App 1/Portal 1/Desktop A/Page 2/Booklet 1 | Cap 4 | No |
| 4 | Web App 1/Portal 1/Desktop A/Page 2/Booklet 1 | | No |
| 5 | Web App 1/Portal 1/Desktop A/Page 2 | Cap 4 | No |
| 6 | Web App 1/Portal 1/Desktop A/Page 2 | | Yes |

In one embodiment, the search for a policy proceeds as follows. The starting point for the search is the resource that owns the capability (i.e., Booklet 2) to which the principal is attempting to access (i.e., Cap 4). This is the current resource. If no policy exists at the current resource for the specific capability, in Step 2 we determine whether or not there is a policy merely on the resource itself. If no policy is found, in Step 3 the current resource is set equal to its parent (i.e., Booklet 1). If the current resource has no policy for Cap 4, we determine whether or not there is a policy on Booklet 1 itself. If no policy is found, in Step 5 the current resource is set equal to its parent (i.e., Page 2). If no policy is found for Cap 4 at the current resource, we determine in Step 6 whether or not there is a policy on Page 2 itself Since this is the case, the search stops at Step 6. Web App 1/Portal 1/Desktop A/Page 2 has policy P₂. Therefore if p satisfies role G, access to Cap 4 is granted for p.

In another embodiment, capabilities are associated with particular resource types. For example, booklets may have a type of capability (e.g., Cap 4) that is not compatible with or available for other resource types (e.g., pages or desktops). Therefore, when searching for a policy as in Table 2, if a capability is not compatible for the current resource, that resource can be omitted from the search. In yet a further embodiment, if a policy is not found for a given resource type, a global library could be consulted to determine if there are any applicable global policies.

In another embodiment, roles and policies can reside in their own hierarchies, apart from the primary resource hierarchy. For applications that do not need to associate roles and/or policies with resources in the primary hierarchy, such an approach can allow for a shallow role and/or policy tree, perhaps only with a single level. Searching smaller hierarchies can potentially reduce the time it takes to find all roles within scope and locate a policy.

Figure 3:
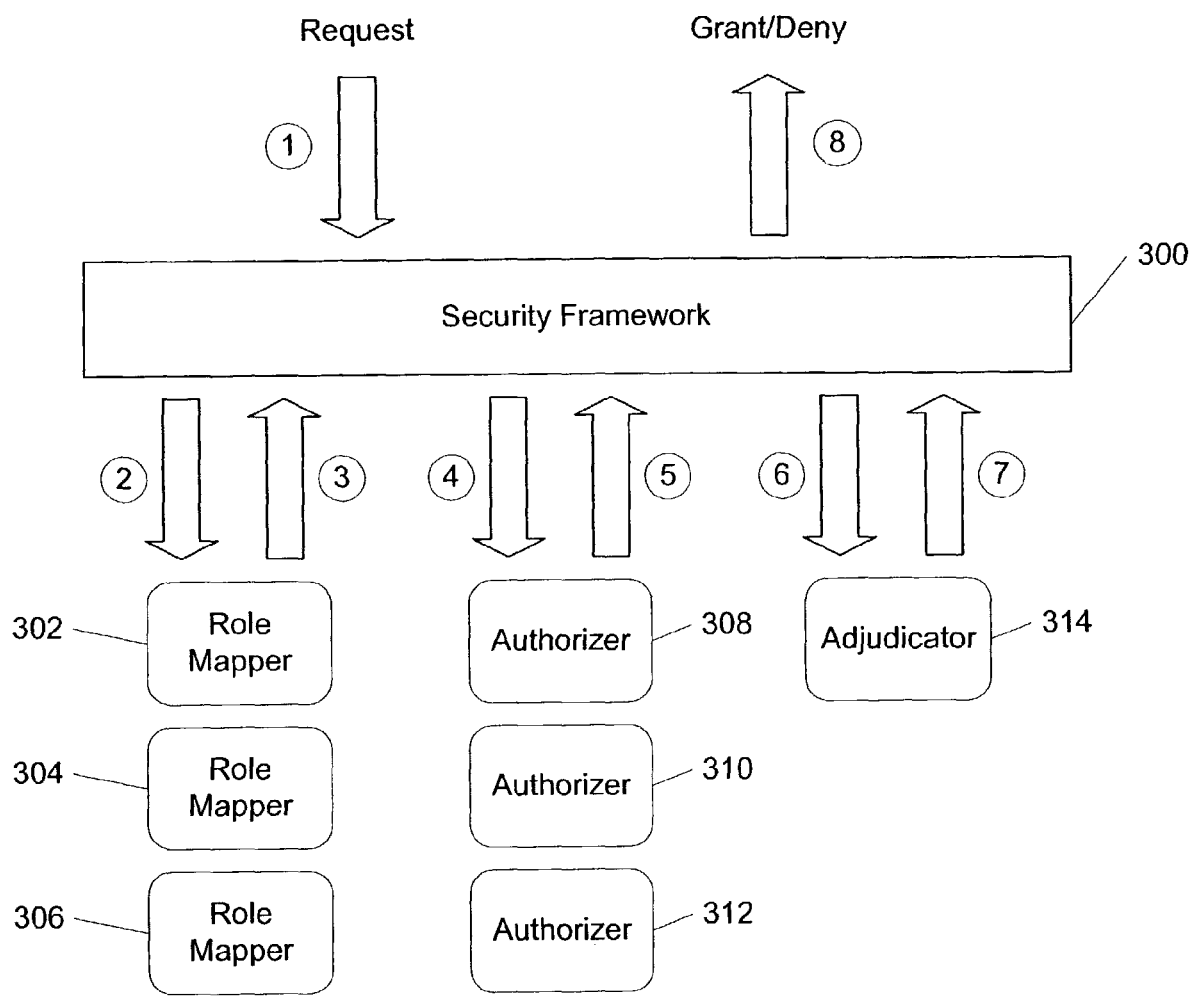
FIG. 3 is a diagram of an authorization system in accordance to one embodiment of the invention.

FIG. 3 is a diagram of an authorization system in accordance to one embodiment of the invention. Although this diagram depicts objects as functionally separate, such depiction is merely for illustrative purposes. It will be apparent to those skilled in the art that the objects portrayed in FIG. 3 can be arbitrarily combined or divided into separate software, firmware or hardware components. Furthermore, it will also be apparent to those skilled in the art that such components, irregardless of how they are combined or divided, can execute on the same computer or can be arbitrarily distributed among different computers connected by one or more networks.

In one embodiment, security framework 300 is a modular security architecture having a published interface that allows for plug-in components. By way of a non-limiting example, a framework can be a library, a set of interfaces, distributed objects, or any other means for software, firmware and/or hardware components to intercommunicate. Connected to the framework are one or more role mapper components (302-306). A role mapper maps (e.g., determines which roles are appropriate) a principal to one or more roles based on a resource hierarchy and a context. Each role mapper can implement its own specialized algorithms in this regard and use information and resources beyond that which is provided by the framework. Also connected to the framework are one or more authorizers (308-312). An authorizer is responsible for determining if access to a resource can be granted based on whether a principal satisfies a resource policy. Each authorizer can implement its own specialized algorithms in this regard and use information and resources beyond that which is provided by the framework. Finally, adjudicator 314 resolves any difference in outcome between authorization modules and returns a final result (e.g., "grant", "deny" or "abstain"). In one embodiment, the adjudicator can take the logical "or" of the final results such that if any result is a "grant", the outcome of adjudication is "grant". In another embodiment, the adjudicator can take the logical "and" of the final results such that if any result is a "deny", the outcome of adjudication is "deny". In yet a further embodiment, the adjudicator can use a weighted average or other statistical means to determine the final outcome.

A process can interact with the framework in a number of ways which will be apparent to those skilled in the art. In one embodiment, a calling process provides a resource access request ① to the framework 300. This request can include information about the principal, the resource to which access is requested, and any context information. In another embodiment, the request can contain references to this information. This information is then provided to one or more role mappers ② by the framework. Each role mapper determines which roles are appropriate for the principal based on their own criteria. In another embodiment, each role mapper can implement a cache to speed up searching for roles. Rather than traversing a resource tree to find all roles within scope, each role mapper can cache roles that were previously retrieved from a resource tree based on a key comprising the resource to which access is requested and the principal. After the initial retrieval from a resource tree, subsequent roles for a given resource-principal combination can be taken directly from the cache.

A set of satisfied roles is then returned to the framework in ③. The framework can provide the information from ① and ③ to the authorizer modules in ④. The authorization modules individually determine whether or not a policy is satisfied based on this information and their own criteria. In another embodiment, each authorizer can implement a cache to speed up searching for policies. Rather than traversing a resource tree to find a policy within scope, each authorizer can cache policies that were previously retrieved from a resource tree based on a key comprising the resource to which access is requested and the principal. After the initial retrieval from a resource tree, subsequent policies for a given resource-principal combination can be taken directly from the cache. The authorizer results (e.g., in terms of grant or deny decisions) are provided to the framework in ⑤ and provided to the adjudicator in ⑥. The adjudicator makes a final decision which it provides to the framework in ⑦. The framework then provides this decision to the calling process in ⑧.

As enterprise applications grow large and complex, so do the number of administrative tasks. One way to reduce the number of tasks that a system administrator is responsible for is to distribute the tasks among a number of administrators. Delegated administration allows a hierarchy of roles to manage administrative capabilities. By way of a non-limiting example, administrative capabilities can include the ability to manage customer accounts, the ability to delegate administrative capabilities, the ability to customize or personalize user interface elements (e.g., portals, booklets, desktops, portlets, etc.), the ability to perform administration of an enterprise application, etc. In another embodiment, any capability or property can be delegated. In one embodiment, delegation is an act whereby a principal in one role enables another hierarchically inferior role to have an administrative capability and/or further delegate an administrative capability. In one embodiment, a delegation role is identical to a role and can thusly be defined using predicates (e.g., user, group, currentDate, segment, etc.).

Figure 4:
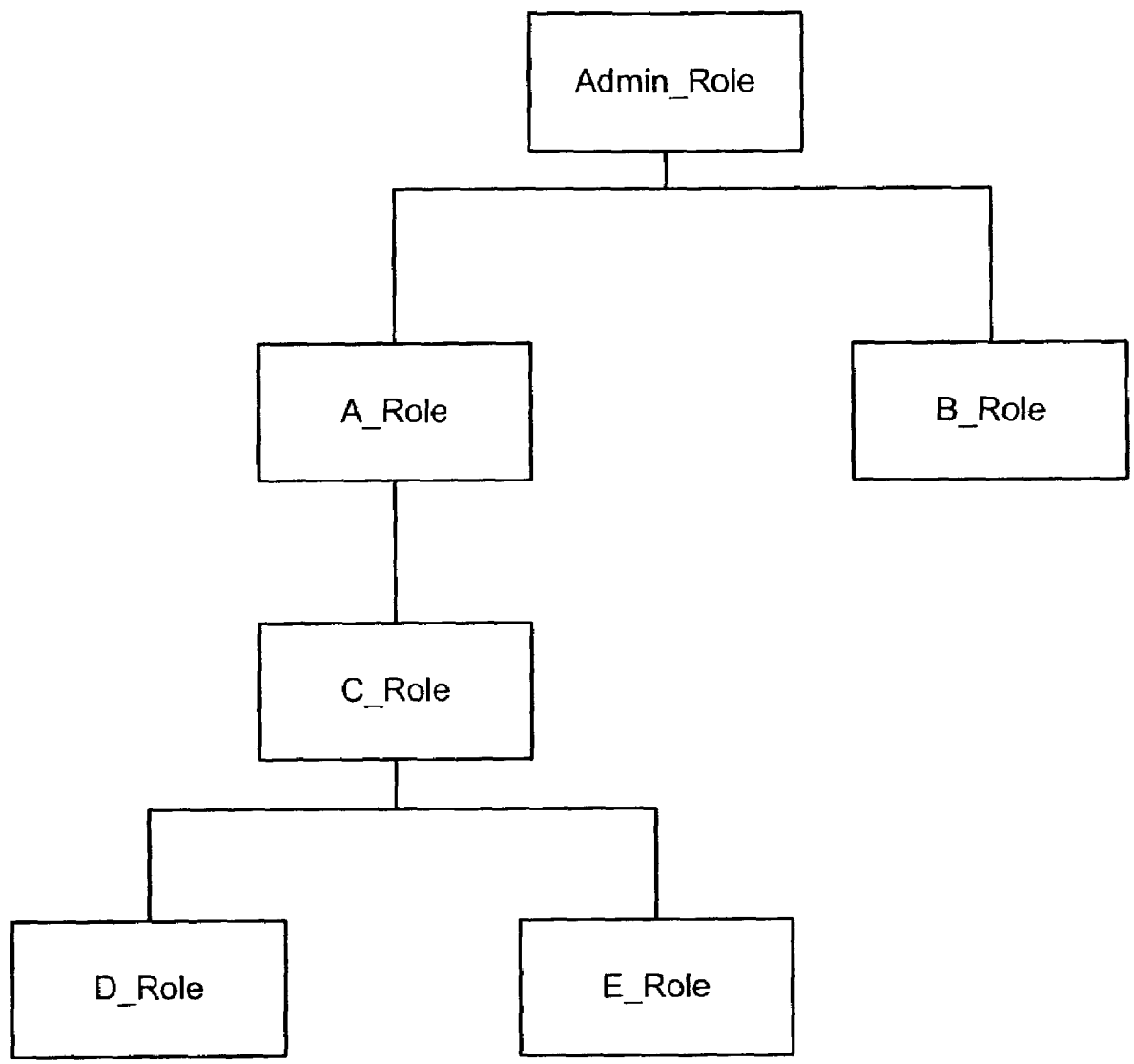
FIG. 4 is an illustration of a delegation role hierarchy in accordance to one embodiment of the invention.

FIG. 4 is an illustration of a delegation role hierarchy in accordance to one embodiment of the invention. In one embodiment, delegation roles can be organized into a delegation hierarchy to control the extent of delegation. In one embodiment, delegation roles can be associated with a single top-level resource, such as an enterprise application, and a delegation role hierarchy can be maintained separate from the resource hierarchy. A security policy can be associated with the enterprise application to limit which principals are allowed to alter the role definitions and the separately maintained role hierarchy. In another embodiment, a fictitious resource hierarchy that mirrors an arbitrary delegation role hierarchy can be utilized whereby each delegation role is associated with a resource corresponding to the delegation role's proper position in the hierarchy. A security policy can be associated with each resource to control which principals can modify the associated role. A security policy at the root of the hierarchy could limit which principals are allowed to modify the fictitious hierarchy itself.

Referring again to FIG. 4, role Admin_Role is at the top of the delegation role hierarchy. In one embodiment, the principal in this role has no limitations in its administrative capabilities or delegation authority. By way of a non-limiting example, a principal in the Admin_Role can modify the definition of delegation roles and the delegation hierarchy. In one embodiment, a principal in a delegation role can delegate administrative capabilities only to roles beneath it in a delegation hierarchy. Admin_Role has two children, A_Role and B_Role. A_Role has one child, C_Role, which as two children: D_Role and E_Role. By way of a non-limiting example, Admin_Role can delegate to all other roles beneath it in the hierarchy. Likewise, A_Role can delegate to C_Role, D_Role and E_Role. Whereas C_Role can only delegate to D_Role and E_Role. The leaves of the tree, D_Role, E_Role and B_Role cannot delegate since they have no children. In another embodiment, a node in the hierarchy can be related to more than one parent. This allows more than one superior role to delegate to an inferior role.

Figure 5:
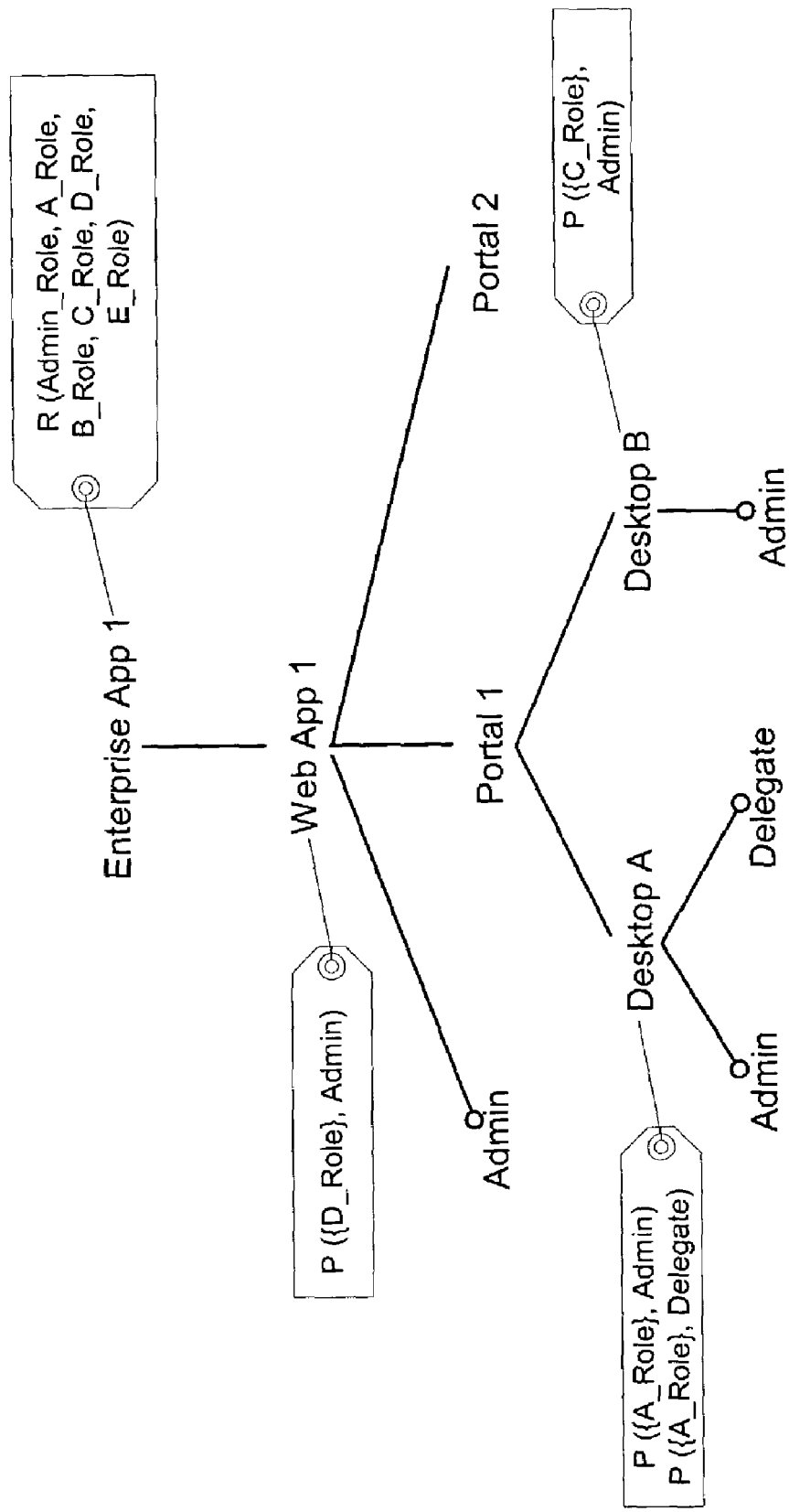
FIG. 5 is an illustration of exemplary delegation security policies in one embodiment of the invention.

In one embodiment, a delegation can be represented by a security policy. The policy is associated with a delegated resource/capability and is based on the role to which the resource/capability was delegated. FIG. 5 is an illustration of exemplary delegation security policies in one embodiment of the invention. Assume for this example that the delegation hierarchy of FIG. 4 holds. Notice that the root resource in FIG. 5, Enterprise App 1 is associated with the following roles: Admin_Role, A_Role, B_Role, C_Role, D_Role and E_Role. The hierarchy depicted in FIG. 5 could include other resources, roles and policies, but is limited for illustrative purposes. In one embodiment, a delegation creates a policy on the resource who's capability is being delegated. For example, resource Web App 1 has an Admin capability and an associated security policy P(D_Role). A principal in the role of C_Role, A_Role or Admin_Role created this policy by delegating to D_Role the Admin capability for Web App 1. (It will be apparent to those of skill in the art that any capability can be delegated; i.e., not just Admin.) Thus, principals that satisfy D_Role can perform administration of Web App 1. However, since Web App 1 does not have a delegation capability, a principal satisfying the D_Role cannot further delegate Web App 1's Admin capability.

Resource Desktop A has two capabilities, Admin and Delegate, each of which has a policy. The policy P(A_Role) attached to both indicates that a principal in the role of Admin_Role delegated to Role_A the capability to both administer Desktop A and further delegate this capability. Thus, a principal in Role_A can further delegate both the Admin and Delegate capabilities to hierarchically inferior delegation roles (i.e., C_Role, D_Role and E_Role). For example, resource Desktop B has a capability Admin that has a policy P(C_Role). This policy was put in place by a principal in the role of A_Role or Admin_Role. A principal in the role of C_Role will be able to administer Desktop B, but will not be able to further delegate this capability.

In one embodiment, a delegation to a node that is already delegated to by a principal in a hierarchically superior delegation role is not permitted. Referring to FIGS. 4 and 5, and by way of a non-limiting illustration, if resource Portal 2 had a policy P(A_Role), a principal in the role of C_Role would not be able to delegate Portal 2 since it had been delegated to a role superior to C_Role (i.e., A_Role).

In another embodiment, aspects of user group administration can be delegated. By way of a non-limiting example, user groups can by organized into a hierarchy by viewing them as children of an enterprise application resource. Capabilities that can be delegated include: user profile administration, the ability to view the members of group, and the ability to create, update and remove users and groups.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for authorization to adaptively control access to a resource in a hierarchy of resources, comprising the steps of:
   determining, by a computer system, a first set of one or more roles that are within scope of the resource from one of: 1) the hierarchy of resources; and 2) a first cache;
   determining, by the computer system, a policy within scope of the resource from one of: 1) the hierarchy of resources; and 2) a second cache, wherein the policy is an association between the resource and a second set of roles, wherein the policy is from a set of policies, each policy in the set of policies associated with a resource in the hierarchy of resources, and wherein a policy is within scope of a resource if the policy is associated with the resource or if the policy is associated with another resource that is hierarchically superior to the resource in the hierarchy of resources;
   determining, by the computer system, from the first set of roles, a third set of one or more roles that are satisfied by a principal;
   providing, by the computer system, for an evaluation of the policy based on the third set of one or more roles;
   determining, by the computer system, whether to grant the principal access to the resource based on the evaluation of the policy; and
   granting, by the computer system, access to the resource if one or more roles from the third set of roles are in the second set of roles;
   wherein a role in the first set of roles is retrieved from the first cache if the role was previously retrieved from the hierarchy of resources; and
   wherein the policy is retrieved from the second cache if the policy was previously retrieved from the hierarchy of resources.

2. The method of claim 1 including the step of: allowing the principal to be an authenticated user, group or process.

3. The method of claim 1 including the step of:
   determining whether role expressions for the first set of roles evaluates to true or false for the principal in a context.

4. The method of claim 1 wherein:
   a role in the first set of roles has at least one role expression that is a Boolean expression that includes at least one of (1) another Boolean expression and (2) a predicate.

5. The method of claim 4 wherein:
   the predicate is one of user, group, time and segment.

6. The method of claim 4 wherein:
   the predicate is evaluated against the principal and a context.

7. The method of claim 4 wherein:
   the predicate is a segment that is specified in plain language.

8. A method for authorization to adaptively control access to a resource in a hierarchy of resources, comprising the steps of:
   determining a first set of one or more roles that are within scope of the resource for a principal from one of: 1) a searchable hierarchically arranged plurality of roles; and 2) a first cache;
   determining a policy within scope of the resource from one of: 1) the hierarchy of resources; and 2) a second cache, wherein the policy is an association between the resource and a second set of roles, wherein the policy is from a set of policies associated with resources in the hierarchy of resources, and wherein a policy is within scope of a resource if the policy is associated with the resource or if the policy is associated with another resource that is hierarchically superior to the resource in the hierarchy of resources;
   determining, from the first set of roles, a third set of one or more roles that are satisfied by the principal;
   providing for an evaluation of the policy based on the third set of one or more roles;
   determining whether to grant the principal access to the resource based on the evaluation of the policy; and
   granting access to the resource if one or more roles from the third set of roles are in the second set of roles;
   wherein a role in the first set of roles is retrieved from the first cache if the role was previously retrieved from the hierarchy of resources; and
   wherein the policy is retrieved from the second cache if the policy was previously retrieved from the hierarchy of resources; and
   wherein the first cache and the second cache are different.

9. The method of claim 8 including the step of:
   allowing the principal to be an authenticated user, group or process.

10. The method of claim 8 including the step of:
    evaluating role expressions for the first set of roles to true or false for the principal in a context.

11. The method of claim 8 wherein:
    a role in the first set of roles has at least one role expression that is a Boolean expression that includes at least one of (1) another Boolean expression and (2) a predicate.

12. The method of claim 11 wherein:
    the predicate is one of user, group, time and segment.

13. The method of claim 11 include the step of:
    evaluating the predicate against the principal and a context.

14. The method of claim 12 wherein:
the segment predicate is specified in plain language.

15. A computer system for authorization adapted for controlling access to a resource in a hierarchy of resources, comprising:
one or more processors;
object code executing on the one or more processors implementing:
at least one role-mapper to map a principal to a first set of one or more roles within scope of the resource, wherein a role in the first set of roles is retrieved from one of: 1) the hierarchy of resources; and 2) a first cache, wherein mapping includes determining whether or not the role is satisfied by the principal;
at least one authorizer coupled to the at least one role-mapper, the at least one authorizer being configured to determine if a policy is satisfied based on the first set of roles, wherein the policy within scope of the resource is retrieved from one of: 1) the hierarchy of resources and 2) a second cache, wherein the policy is an association between the resource and a second set of roles, wherein the policy is from a set of policies, each policy in the set of policies associated with a resource in the hierarchy of resources, and wherein a policy is within scope of a resource if the policy is associated with the resource or if the policy is associated with another resource that is hierarchically superior to the resource in the hierarchy of resources; and
an adjudicator coupled to the at least one authorizer, the adjudicator being configured to render a decision based on the determination of the at least one authorizer, wherein access is granted to the resource if one or more roles in the first set of roles is in the second set of roles; and
wherein a role in the first set of roles is retrieved from the first cache if the role was previously retrieved from the hierarchy of resources;
wherein the policy is retrieved from the second cache if the policy was previously retrieved from the hierarchy of resources.

16. The computer system of claim 15 wherein:
the principal is an authenticated user, group or process.

17. The computer system of claim 15 wherein:
role expressions for the first set of roles evaluates to true or false for the principal in a context.

18. The computer system of claim 15 wherein:
a role in the first set of roles has at least one role expression that is a Boolean expression that includes at least one of another Boolean expression and a predicate.

19. The computer system of claim 18 wherein:
the predicate is one of user, group, time and segment.

20. The computer system of claim 18 wherein:
the predicate is evaluated against the principal and a context.

21. The computer system of claim 19 wherein:
the segment predicate is specified in plain language.

22. A machine readable medium having instructions stored thereon that when executed by a processor cause a system to:
determine a first set of one or more roles that are within scope of a resource for a principal from one of: 1) a hierarchy of resources; and 2) a first cache;
determine a policy within scope of the resource from one of: 1) the hierarchy of resources; and 2) a second cache, wherein the policy is an association between the resource and a second set of roles, wherein the policy is from a set of policies, each policy in the set of policies associated with a resource in the hierarchy of resources, and wherein a policy is within scope of a resource if the policy is associated with the resource or if the policy is associated with another resource that is hierarchically superior to the resource in the hierarchy of resources;
determine a third set of one or more roles from the first set of roles that are satisfied by the principal;
provide for an evaluation of the policy based on the third set of one or more roles;
determine whether to grant the principal access to the resource based on the evaluation of the policy;
grant access to the resource if one or more roles from the third set of roles are in the second set of roles;
wherein a role in the first set of roles is retrieved from the first cache if the role was previously retrieved from the hierarchy of resources; and
wherein the policy is retrieved from the second cache if the policy was previously retrieved from the hierarchy of resources.

23. The machine readable medium of claim 22 further comprising instructions which when executed cause the system to:
allow the principal to be an authenticated user, group or process.

24. The machine readable medium of claim 22 further comprising instructions which when executed cause the system to:
evaluate role expressions for the first set of roles to true or false for the principal in a context.

25. The machine readable medium of claim 22 wherein:
a role in the first set of roles has at least one role expression that is a Boolean expression that includes at least one of another Boolean expression and a predicate.

26. The machine readable medium of claim 25 wherein:
the predicate is one of user, group, time and segment.

27. The machine readable medium of claim 25 wherein:
the predicate is evaluated against the principal and a context.

28. The machine readable medium of claim 26 wherein:
the segment predicate is specified in plain language.

* * * * *

UNITED STATES PATENT AND TRADEMARK OFFICE
CERTIFICATE OF CORRECTION

PATENT NO. : 7,653,930 B2  Page 1 of 1
APPLICATION NO. : 10/366778
DATED : January 26, 2010
INVENTOR(S) : Philip B. Griffin et al.

It is certified that error appears in the above-identified patent and that said Letters Patent is hereby corrected as shown below:

On the Title page, in Item (57), in column 2, in "Abstract", line 4, delete "east" and insert -- least --, therefor.

On page 4, in column 1, under "Other Publications", line 34, delete ""USDataCenter" and insert -- "US DataCenter --, therefor.

On page 4, in column 2, under "Other Publications", line 10, delete "Desigining" and insert -- Designing --, therefor.

On page 5, in column 1, under "Other Publications", line 26, delete "050302,html," and insert -- 050302.html, --, therefor.

In column 6, line 39, delete "and or" and insert -- and/or --, therefor.

In column 7, line 51, delete "itself" and insert -- itself. --, therefor.

In column 10, line 32, delete "Role_A" and insert -- A_Role --, therefor.

In column 10, line 34, delete "Role_A" and insert -- A_Role --, therefor.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO.       : 7,653,930 B2                                              Page 1 of 1
APPLICATION NO.  : 10/366778
DATED            : January 26, 2010
INVENTOR(S)      : Griffin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 916 days.

Signed and Sealed this

Twenty-third Day of November, 2010

David J. Kappos
*Director of the United States Patent and Trademark Office*